May 25, 1965   R. H. ANDERSON   3,185,491
SEAL FOR PIPE JOINTS
Filed Aug. 1, 1962

INVENTOR.
RICHARD H. ANDERSON
BY
Meyer, Baldwin, Doran & Egan
ATTORNEYS

United States Patent Office 3,185,491
Patented May 25, 1965

3,185,491
SEAL FOR PIPE JOINTS
Richard H. Anderson, Dover, Ohio, assignor to The Robinson Clay Product Company, Akron, Ohio, a corporation of Maine
Filed Aug. 1, 1962, Ser. No. 213,939
14 Claims. (Cl. 277—237)

The present invention relates to seals for pipe joints.

It is an object of the present invention to provide a novel seal for a pipe joint that can be made without the use of molds and can be easily assembled in the field to provide a strong water tight joint.

It is an object of the present invention to provide a novel seal for a pipe joint without the use of a mold and yet the resultant seal is corrosion resistant and water-tight and has a strong permanent bond with the pipe.

Other objects will be apparent from the description that follows, the appended claims and the drawings in which:

FIG. 1 shows one end member of one pipe that is a bell end, the other end member of the other pipe being a spigot end and an O ring between the bell and spigot end members for assembling the two together;

Figure 1:
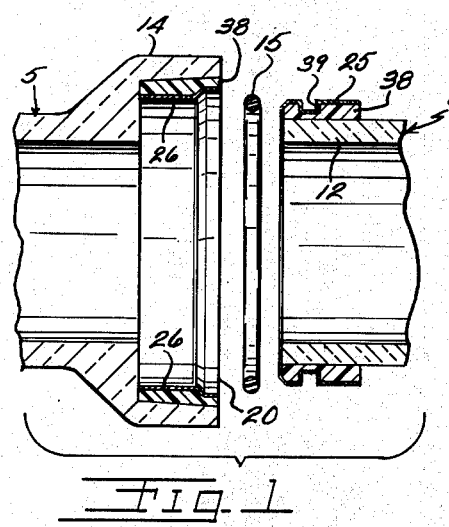
FIG. 1 is an exploded fragmentary side elevational view of the end members of two clay pipes of like construction before they are joined together.
Figure 2:
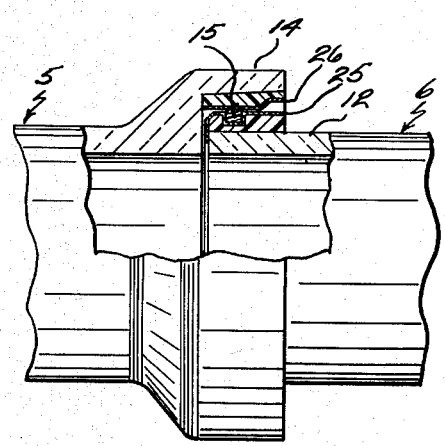
FIG. 2 is a side elevational and partly sectional view of the two clay pipes of FIG. 1 joined together to form a strong water tight bond therebetween.
Figure 6:
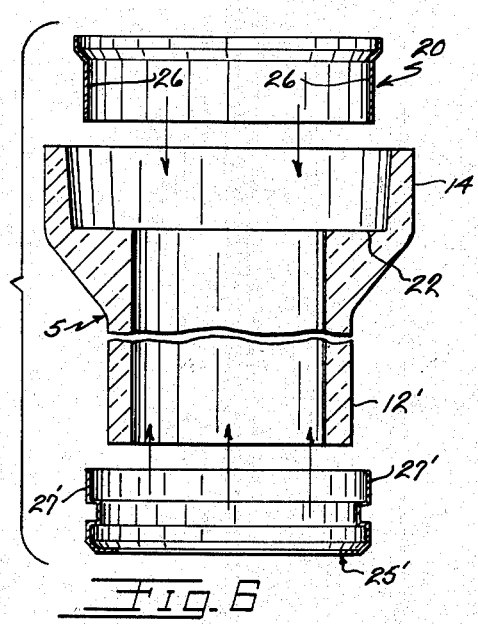
Figure 7:
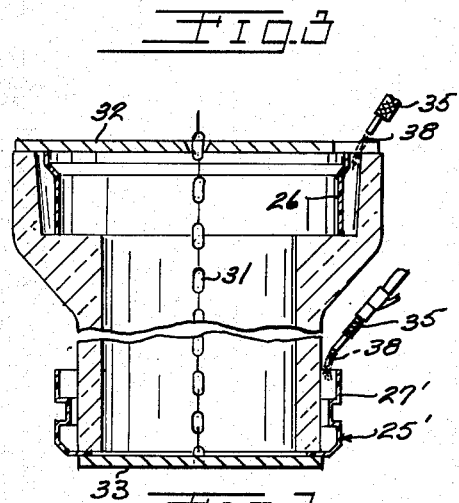

FIG. 6 is an exploded and partly sectional view of an upright length of clay pipe before the construction of seals for each end thereof and showing in exploded position the thin hard plastic shells that are to become a part of the seal construction; and FIG. 7 is a fragmentary partly sectional view of the pipe of FIG. 6 assembled with the plastic shells, and showing hoses for applying a pourable back-up material such as asphalt or other suitable material between each shell and its associated pipe end to bond the shell thereto and form the strong water tight seals shown in FIGS. 1 and 2.

The present invention is directed to a seal for pipe joints, including clay sewer pipe joints. The present invention also includes the novel seal, which provides an excellent, tough, resilient water and chemical barrier for the sewer pipe joints.

The novel seals of the present invention are preferably used in a push-type joint as illustrated in FIGS. 1 and 2 in which two pipes 5 and 10 of like construction are shown. As seen in these figures, a spigot end 12 of pipe 6 is pushed into sealing relationship with a bell or socket end 14 of pipe 5. An elastomeric O-ring 15 is slipped into a groove on the spigot end 12 before assembling the two pipes, the O ring 15 being compressed in the final assembly joint as seen in FIG. 2 to make the same water tight.

Toroidal push-type joints are described in my United States Patent No. 2,816,782 in which the formation of seals from a polyvinyl chloride plastisol is described. Although excellent seals are obtained by the use of a polyvinyl chloride plastisol, which is one of the very few materials that make thoroughly satisfactory seals, as noted in the above mentioned patent, the formation of these polyvinyl chloride seals requires the use of expensive molds which adds to the manufacturing expense and the resultant seals made thereby must be protected for transportation.

In the present invention, excellent seals are provided for the push-type pipe joints without the use of molds and the resultant seals are ready for transportation without further protective measures.

An efficient mold-less method of forming the seals is illustrated in FIGS. 6 and 7. As seen in FIGS. 6 and 7, clay pipe 5 may be provided with the two component seals by assembling the same with a thin hard plastic shell 20 adapted to set on an annular ledge 22 of the socket end 14 and plastic shell 25' adapted to fit around spigot end 12.'

Shells 20 and 25' are readily manufactured by the rotational casting of polyethylene or polypropylene to close dimensions so that the resultant joint will fit together tightly and accurately. The shells may also be made by injection molding or blow molding. Thus, the inner surface 26 of shell 20 and the outer shell 27' of shell 25' are designed to fit together quickly and telescopically with slight clearance to form a water tight joint with the aid of the sealing O ring 15—even though the clay or other pipes may not be perfectly round.

As seen in FIG. 7, the assembled upright pipe can be suspended from a moving conveyor by a chain 31 and an upper support bar 32 and a lower support plate 33. A hose 35 may be used to pour a liquid back-up material 38 between each of the plastic shells 20 and 25 and its associated pipe walls to bond the shells thereto. The liquid back-up material may be a material such as asphalt or a hot-melt synthetic resin composition, which when heated is pourable and when cooled becomes solid and water impermeable. In any case, it is self-bonding between the shell and the pipe.

When the liquid back-up material is solidified, the excellent two component seal comprising a thin hard plastic shell and a water resistant back-up material is formed as shown in FIGS. 1 and 2.

Thus, the spigot end 12 of pipe 6 (FIGS. 1 and 2) is provided with a two component seal comprising a shell 25 which is similar to shell 25' shown in FIGS. 6 and 7 and which is bonded to end member 12 by the solidified back-up material 38. The shell 25 is provided with an annular generally rectangular groove 39 that is radially spaced from the wall of pipe end 12 and is adapted to seat the compressed O-ring 15, as best seen in FIG. 3, to form a water tight joint between pipes 5 and 6.

Figure 3:
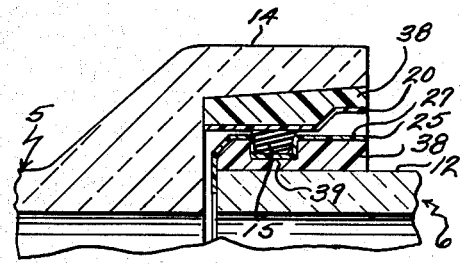
FIG. 3 is an enlarged sectional view of the upper portion of FIG. 2 showing the details of the water tight joint construction.
Figures 4, 5:
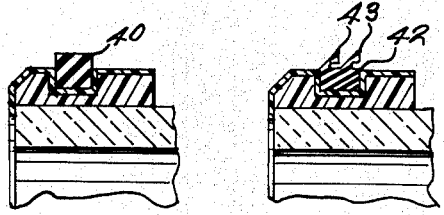
FIG. 4 is an enlarged sectional view of the upper portion of FIG. 2 illustrating another embodiment of the spigot end seal of the clay pipe of FIG. 2 in which a square section ring is used as a sealing member.
FIG. 5 is an enlarged sectional view of the upper portion of FIG. 2 illustrating still another embodiment of the spigot end seal of the clay pipe in which a finned ring is used as a sealing member.

Although the preferred sealing member is the O ring 15 shown in FIGS. 1–3, other sealing means including a square section ring 40 (FIG. 4) and a finned-section ring 42 (FIG. 5) having a plurality of annular fins 43 that grip the associated socket end seal may be used to provide a water tight joint.

The purpose of shell 26 is to true up the generally out-of-round interior face of the bell or socket end of the pipe whereby a pipe of uneven dimensions is provided with a sealing ring of substantially true circular dimensions.

Using the novel hard plastic shell technique, joints for ring pipes may be made by providing complementary male and female seals, each seal comprising a thin hard annular plastic shell and a back up material that bonds the same to the associated pipe end. The male and female ends can be made into a waterproof joint by solvent welding or adhesive welding.

Although there are many tough, hard, resilient resin compositions which are suitable for the outer shell material of these novel seals, polypropylene and polyethylene have been found to be outstanding. These polyalkylene polymers are strong, light and, yet, have great impact strength as well as flexural strength. In this respect, the following properties of polyethylene and polypropylene are preferred:

| Properties | Polyethylene | Polypropylene |
| --- | --- | --- |
| Specific gravity | 0.93 | 0.90. |
| Tensile strength | 1,600 p.s.i. | 4,300 p.s.i. |
| Percent elongation | 100% | 300%. |
| Compression strength | 2,000 p.s.i. | 9,000 p.s.i. |
| Flexural strength | 6,000 p.s.i. | 9,000 p.s.i. |
| Impact strength, Izod | 3 ft. lbs. | 3 ft. lbs. |
| Hardness, Shore | 60–70 D Scale | Rockwell 90. |

The back-up material 38 may be a synthetic resin composition of polyethylene and nonaromatic polydiene resin that is suitable for hot-melt application to the ends of clay pipe or other objects to be joined and contains a synthetic resin mixture of about as low as 5 to 10 or 15 up to as high as about 50% by weight of polyethylene and about 85 to 50% by weight of an aliphatic nonaromatic thermoplastic hydrocarbon polydiene resin derived from deep cracking of petroleum oils such as Piccopale, a thermoplastic hydrocarbon resin substantially devoid of aromatic material (sold by Pennsylvania Industrial Chemical Corporation, Clairton, Pennsylvania) and generally having a bell and ring softening point of about 70 to 120° C. Another resin of the same type as Piccopale is Neville LX–1000 (sold by Neville Chemical Company, Pittsburgh, Pennsylvania).

It has been found that when the amount of polyethylene modifier used with the petroleum aliphatic hydrocarbon resins above described is much over 50% by weight of the mixture, the resultant composition shrinks excessively, has poor adherence to both the clay tile and the hard plastic shell, and is undesirable for jointing purposes or for other bonding applications such as fastening T's to a main pipe line. While amounts as low as about 5 to 10% by weight of polyethylene can be used to provide some benefits of the present invention, it has been found that the use of less than this minimum amount produces a composition having high mix viscosity when heated at a reasonable temperature, poor impact resistance, insufficient resistance to movement under compression, and poor weather resistance and, thus, the composition is not satisfactory for use in some commercial pipe jointing applications. However, amounts of polyethylene may be used preferably from about as low as 15 to as high as 50% by weight of the total resin component with proper adjustment of fillers such as inorganic fillers including glass fibers, silica, flint, calcium carbonate and organic fillers including coke. For the best results it has been found that about 30 to 40 parts of polyethylene should be used per about 70 to 60 parts by weight of the thermoplastic hydrocarbon polydiene resin substantially devoid of aromatic hydrocarbon material.

Other ingredients of the above described composition, which is well adapted for use to form annular sealing joint members around ends of clay pipe, are fillers such as pulverized clay pipe grog, chopped or milled glass fibers, long fiber wollastonite ($CaO \cdot SiO_2$), silica, coke, Potters flint or other well known fillers and extenders which are used to save the more expensive resin materials as well as to improve the weather resistance and compression set properties of the composition.

The sealing compositions may be formed into desired shapes such as annular, toroidal sealing members for bell and spigot ends of clay pipes by positioning the thin plastic shells to radially space the same from their associated pipe ends and then using the preferred back-up material, heating and melting together the hydrocarbon resin and polyethylene at a temperature of about 375 to 525° F. to form a relatively low viscosity liquid and then cooling the liquid mixture to a temperature of about 150–200° F. to solidify the same and provide a solid, impact resistant, high tensile strength synthetic resin composition. The above liquid mixture can be poured into the cavity formed by the thin plastic shell around an end of a length of clay pipe and a solid seal formed in situ thereon without using pressure by merely cooling the mixture to solidify the same. The above technique may be used to produce joints at the factory without the use of expensive ovens, pumping equipment, etc.

One or more of the above described fillers may also be added to the liquid mixture and stirred therein to provide a relatively homogeneous sealing and bonding composition.

Because of forming the petroleum hydrocarbon resins through polymerization of cracked petroleum oil fractions, it is difficult to describe the resin except as a nonreactive thermoplastic aliphatic hydrocarbon polydiene resin having a softening point of about 65 to 120° F. ring and ball, and preferably about 90 to 110° F. ring and ball; an average molecular weight of preferably about 1000 to 1300 and generally 600 to 1800 although, for best results, 1100; an acid number of less than about 10 and generally less than about 5 and for best results less than about 1; a saponification number of less than about 5 and preferably less than 2; an iodine number (corrected for substitution) generally of about 10 to 60 and preferably about 25 to 35; a specific gravity at 25/25° C. of generally about .95 to 0.99 and preferably about .970 to .975; a color on the Gardner scale of G–15 maximum; a refractive index at 20° C. of 1.1 to 1.2 and preferably about 1.152; and being soluble in aliphatic hydrocarbons, aromatic hydrocarbons, chlorinated hydrocarbons and naval stores. A suitable thermoplastic material as defined in this paragraph is sold commercially as Piccopale (Pennsylvania Industrial Chemical Corporation), including Piccopale 100 having a ball and ring softening point of 100° F. The Piccopale resin generally is a solid powder or flake which is brittle and weak when heated alone and cast into molds.

Although some benefit can be obtained by the use of other water resistant back-up materials such as asphalts and polystyrene resins, by far the best seals are made when the back-up materials are (1) hot melt synthetic resin compositions comprising polyethylene and a hydrocarbon polydiene resin or (2) a rigid foamed polyurethane material. Of the above two preferred materials, the hot melt synthetic resin has given the most satisfactory service in the field.

As to the preferred polyurethane material, as is well-known in the art, the composition may comprise a (1) polyurethane-forming ingredient including a polyol material and an organic polyisocyanate together with (2) a blowing agent to provide the foamed polyurethane material. In the ordinary method of making cellular polyurethanes (which are preferably foamed polyester or polyetherisocyanate reaction products), a viscous nonlinear liquid polyester or polyether is mixed thoroughly with an organic polyisocyanate which is preferably a diisocyanate or triisocyanate having 2 or 3 isocyanate groups. Also mixed thoroughly with the above described polyester or polyether and polyisocyanate, are ingredients including a cross linking agent such as glycerol, 1,3-propylene glycol or Quadrol [N,N,N',N'-tetrakis(2-hydroxy propyl) ethylene diamine], a reaction catalyst such as certain tertiary alkyl amines including N-methyl morpholine, and a blowing agent such as water or a liquified Freon gas such as difluoro dichloro methane. When water is used, gaseous carbon dioxide is formed to froth and provide the foamed product.

In making the above preferred foamed polyurethane material, suitable polyisocyanates are p,p'-diisocyanato diphenyl methane, tolylene diisocyanate, durene diisocyanate and p,p',p"-triisocyanato triphenyl methane. Suitable polyesters are polyethylene glycol adipate, polypropylene glycol sebacate and other esters of di- or tricarboxylic acids and alkylene glycols that are of the cross-linked type and have substantial amounts of trifunctional materials such as trimethylol propane or glycerol in their chains to promote branching for the formation of rigid foamed polyurethanes. Generally, the molecular weight of these trifunctional polyesters are about 400 to 600 up to 1500 or more, the lower molecular weights providing the stiffest and most rigid foams.

Suitable polyethers are polyethylene etherglycol, polypropylene ether glycol, poly (ethylene-propylene) ether glycol, and polytetramethylene ether glycol, the lower molecular weights, say 400 to 1000, being preferred for the more rigid back-up materials.

In any event, a hot melt synthetic resin is the preferred back-up material although the rigid polyurethane materials just described also provide excellent resilient and water resistant seals. As previously indicated, many back-up materials including foamed polystyrene, sulphur silica, polyterpene, asphalt and coal tar compositions can be used to provide commercially satisfactory seals for clay sewer pipe and the like.

The following examples are intended to illustrate the present invention and not to limit it in any way:

*Example 1*

A series of pipe joint lengths were prepared for use in the field by applying seals thereto, the details of which are to follow.

A thin, tough, annular plastic shell of polypropylene that was made by rotational casting was positioned around the bottom of a length of vitrified clay sewer pipe, the bottom pipe end being a spigot end such as end 12 shown in the drawings. The shell such as shell 25, having a greater dimension than the spigot end of the pipe, was placed below the spigot pipe end and the pipe end inserted therewithin. Meanwhile, as the conveyor moved along to another station, another hard, thin, annular polypropylene shell, having a dimension less than the bell end of the clay pipe, was placed inside the upwardly directed bell end where it rested on the upper horizontal annular shoulder such as shoulder 22 in the drawings. The pipe was suspended from the moving conveyor by a suitable support plate, support bar and chain such as support plate 33, support bar 32, and chain 31 shown in FIG. 7. The shells of polypropylene were then bonded to the respective associated pipe ends to form an improved seal at each end as seen in FIGS. 1 and 2 by pouring a synthetic hot met composition comprising 15 parts by weight of polyethylene and 85 parts by weight of a hydrocarbon polydiene resin (Piccopale 100) as previously described herein between each of said shells and their associated pipe walls to form a hard, tough, flexible, yet impact resistant and waterproof gasket therefor. The pipes were then ready for shipment without further protection. The pipes were joined together in the field with the aid of of a neoprene O ring such as O ring 15 which was first inserted in a groove in the outer plastic shell surface of the spigot end seal. The pipes were then pushed together to compress the O ring and form an excellent waterproof seal.

The novel seals of the present invention are suitable for clay sewer pipe concrete, cement sewer pipes, cast iron pipes, cement asbestos pipes and the like, even though it is very difficult to obtain the very good joints that are so necessary for a sewer system. The joints, of course, must be corrosion resistant and water tight and the material used as the jointing compound must have certain desirable properties such as a strong permanent bond, proper density, chemical inertness, flexibility, resistivity to high pressure, ability to withstand weathering for long periods, adaptability for easy use, and the ability to set quickly. As previously indicated, in the past many types of bonding materials have been used for jointing materials in clay pipes, but very few have been satisfactory because of the rigid requirements above described. For instance, cement has been used as bonding material but such pipe and joints have been too rigid, have allowed the infiltration of water and root penetration, and were difficult to prepare. Likewise, asphaltic material has been used as the bonding agent for pipe joints. However, these asphaltic compositions did not resist root growth and were unsatisfactory as were the cement bonding materials. Therefore, surprisingly, the novel, yet easily prepared seals of the present invention provide unusually good pipe joint seals. These seals, such as those made in the Example 1, form a strong, permanent bond, resist root growth, are quick setting, and at the same time are dense, chemically inert, flexible and resistant to pressures encountered in sewer pipe joining.

*Example 2*

A series of pipe lengths were provided with unusually good seals using the method described in Example 1 except that the thin, tough, hard shells were made of polyethylene having a specific gravity of 0.93, a tensile strength of 2000 p.s.i., a flexural strength of 6000 p.s.i., an impact strength (Izod) of 3 foot pounds per inch of notch, and a hardness on the Shore D scale of 60 to 70. The pourable composition used to bond the shells to the clap pipe and provide the water impervious barrier had the following formulation:

| Ingredients— | Parts by weight |
|---|---|
| Piccopale 100 (a petroleum hydrocarbon resin having a molecular weight of about 1000 and having a ball and ring softening point of 100° C. instead of 110° C.) | 75 |
| Pulverized clay pipe grog | 30 |
| Potters flint —200 mesh | 70 |
| Low molecular weight polyethylene (M.W. 1500) | 30 |
| Long fiber wollastonite | 30 |

The above synthetic hot melt compositions had a solidification point of about 180 to 200° F. and had the following properties:

| | |
|---|---|
| Pour temperature | 430° F. |
| Viscosity at 425° F. | 3500 c.p.s. |
| Total shrinkage as cast to 10° F. | 0.50%. |
| Modulus of rupture at 80° F. | 1750 p.s.i. |
| Sag at 130° F. for 6 hours | None. |
| Tensile strength | 725 p.s.i. |
| Compression set at 80° F. 200 p.s.i., 22 hours | 20.0%. |
| Adhesion to ceramics (tensile) | 150 p.s.i. |
| Impact resistance | 30 inch lbs. |
| Specific gravity | 1.50. |
| Color | Brown. |
| Chemical resistance after exposure at 80° F. for 1 year— | |
| Water | No attack. |
| In sulphuric acid | Do. |
| In hydrochloric acid | Do. |
| In nitric acid | Do. |
| 20% sodium hydroxide | Do. |
| 20% Tide detergent solution | Do. |
| Durometer hardness, Shore A— | |
| 10° F. | 97. |
| 80° F. | 97. |
| 130° F. | 85. |

The resultant two-component pipe joint seals provided excellent water resistant strong, tough seals that were unusually tight and effective in clay pipe sewer systems when the above pipe lengths were joined together with the use of an elastomeric O-ring such as one made of neoprene, a butadiene-styrene copolymer, polyvinyl chloride or natural rubber.

In the above examples, other hard, tough plastic materials may be used for the annular shells described in Examples 1 and 2 inasmuch as other hard, impact resistant plastic materials such as polystyrene, polyvinyl chloride, copolymers of styrene and butadiene, copolymers of styrene and acrylonitrile, homopolymers of methyl methacrylate, copolymers of methyl methacrylate with other monomers such as acrylonitrile or styrene, and polychloroprene may be used to provide nearly equivalent results.

Likewise, in the above working examples, other water resistant bonding compositions can be used for the organic hot melt synthetic resin back-up material used between the shells and the pipe walls. Organic back-up materials that can be substituted for the hot melt resin used in Examples 1 and 2, are asphalts, sulphur silica compositions, rigid polyurethane foams, polystyrene foam and a hot melt composition comprising various proportions of polyethylene with a polydiene resin or a polyterpene resin.

It is understood that in accordance with the provisions of the patent statutes, the particular form of product shown is set forth for purposes of explanation and illustration and that various modifications of said product may be made without departing from my invention.

Having thus described my invention, I claim:

1. A seal for use between connected telescoping ends of generally cylindrical pipe sections comprising a preformed truly annular collar of thin and relatively stiff hard plastic material having a relatively high tensile strength, impact resistance and hardness, means for securing said collar in fluid-tight relationship to one of said pipe end sections generally concentric therewith, the means comprising a water resistant back-up material for said hard collar, the back-up material being softer and having less tensile strength than said collar, said collar having an annular groove opening toward the other of said telescoping pipe end sections, and a resilient annular sealing ring seated in said groove and sealingly engaging said other pipe end section.

2. A ball and spigot pipe adapted for sealing with another like pipe in end-to-end telescoping relationship comprising a preformed truly annular collar of thin and relatively stiff hard plastic material secured in fluid-tight relationship to the exterior face of said spigot end and generally concentric therewith, the means comprising a water resistant back-up material for said hard collar, the back-up material being softer and having less tensile strength than said collar, there being an annular groove in said collar opening radially outwardly, means truing the interior face of said bell end to an internal diameter slightly greater than the external diameter of said spigot end collar, a water resistant annular core of back-up material bonding the collar to the pipe, the back-up material being softer and having a lower tensile strength than said collar, and a resilient O ring sealingly engaged in said groove and of a dimension to sealingly engage the interior face of the bell end of a like pipe when the spigot end of one pipe is telescopingly entered into the bell end of a like pipe.

3. The combination with a pipe length, having annular end members for joining to a pipe length of like construction, of a seal therefor comprising an annular hard tough flexible shell of a plastic material spaced radially from an end of the pipe length, said plastic material having the denseness, high tensile strength and hardness of polypropylene of a density of about 0.9, a tensile strength of about 4300 p.s.i. and a hardness of about Rockwell 90, and a water-resistant impact-resistance material disposed between said shell and said pipe end and bonding the same together to form a tough, resilient, corrosion and water resistant pipe seal, the water-resistant material being softer and having less tensile strength than the plastic material of the shell.

4. In combination, a pipe having annular members at each end for joining the pipe to one of like construction, and a seal at each end of the pipe, each seal bonded to its associated annular end member to form a tough, resilient, water and corrosion resistant gasket, the gasket comprising an outer annular relatively thin shell of a polyalkylene material in which the alkylene radical has 2 to 3 carbon atoms, and disposed between said shell and its associated annular pipe end member, a relatively thick annular core of a water resistant, impact resistant organic material.

5. A combination as defined in claim 4 in which the polyalkylene material is polypropylene having a specific gravity of about 0.89 to 0.90, a tensile strength of about 3500 to 5000 p.s.i., a flexural strength of about 6000 to 11,000 p.s.i., and an Izod impact strength of about 1½ to 5 foot pounds per inch of notch, and the back-up material is a hot-melt resin mixture of about 30 to 40 parts by weight of polyethylene having an average molecular weight of about 600 to 5000 and about 60 to 70 parts by weight of a thermoplastic polydiene resin derived from the polymerization of aliphatic unsaturated products from the cracking of petroleum oil, said thermoplastic resin having a ball and ring softening point of about 90 to 110° C., a molecular weight of about 1100, an acid number of not substantially greater than 1, a saponification number substantially not greater than 2, an iodine number of about 30, a specific gravity at 25/25° C. of about .970 to .975, a color on the Gardner Scale of G 15 maximum, and being soluble in aliphatic and aromatic hydrocarbon solvents.

6. In combination, a pipe having annular members at each end for joining the pipe to one of like construction, a seal at one end of the pipe, said seal comprising an outer annular relatively thin hard shell of a polyalkylene and a solid water resistant back-up material disposed between the shell and its associated annular pipe end and bonding the shell thereto, and an elastomeric O ring disposed between said seal and the associated pipe end member of another pipe of like construction to thereby form a water tight seal therebetween.

7. A combination as defined in claim 6 in which the shell has an annular groove adapted to seat said O ring when the seal and the associated end member are joined together.

8. A combination as defined in claim 7 in which the polyalkylene material is polyethylene.

9. A combination as defined in claim 7 in which the polyalkylene material is polypropylene.

10. A combination as defined in claim 9 in which said polypropylene shell is about 1/16 to 1/18 inch thick and the average thickness of the core is about ¼ to ½ inch.

11. A combination as defined in claim 7 in which the back-up material is a hot-melt synthetic resin composition comprising a mixture of polyethylene and a hydrocarbon non-aromatic polydiene resin.

12. In combination, a pair of pipes, each pipe having annular members at each end for joining the pipe to one of like construction, and a seal at each end of the pipe, each seal comprising an outer annular relatively thin hard shell of a polyalkylene and disposed between said shell and its associated annular pipe end member a relatively thick annular core of a solid water-resistant back-up material, and an elastomeric annular O ring disposed between associated end members of the two pipes when they are joined together to effectively seal the resultant joint.

13. In combination, at least two lengths of pipe, each pipe having annular members at each end for joining together pipes of like construction, one of the annular end members of one of the pipes comprising a thin rigid hard annular shell of a plastic material and a thick core of back-up material bonding said shell to its associated pipe end member, and an elastomeric O ring adapted to be compressed between said shell and the associated end member of the other pipe to form a water tight seal therebetween.

14. A seal for use between connected ends of generally cylindrical pipe sections comprising a preformed truly annular collar of a thin and relatively stiff hard plastic material having substantially the physical properties of polypropylene having a specific gravity of 0.90, a tensile strength of about 4300 p.s.i., a compression strength of about 9000 p.s.i., and impact strength (Izod) of about 3 foot pounds and a hardness of Rockwell 90, and a back-up material between said collar and its associated pipe end and bonding the collar and pipe end together whereby a pipe of uneven dimension is provided with a sealing collar of substantially true circular dimensions, said back-up material having substantially the properties of a water resistant hot melt synthetic resin composition having a specific gravity of about 1.5, a tensile strength of about 725 p.s.i., and impact resistance of 30 inch pounds and a Shore A durometer hardness at 10° F. of about 97.

References Cited by the Examiner

UNITED STATES PATENTS

| | | | |
|---|---|---|---|
| 1,578,793 | 3/26 | Apple | 264—274 X |
| 1,759,780 | 5/30 | Figar | 264—274 X |
| 1,856,415 | 5/36 | Halperin | 264—274 X |
| 2,180,695 | 11/39 | Rembert | 264—262 |
| 2,205,910 | 1/40 | Raybould | 277—228 |
| 2,722,438 | 11/55 | Kennison | 277—235 XR |
| 2,895,175 | 7/59 | Reuter et al. | 264—262 |
| 2,999,699 | 9/61 | Lafferty | 277—205 |
| 3,058,752 | 10/62 | Miller | 277—229 |

EDWARD V. BENHAM, *Primary Examiner.*